United States Patent [19]
Eberhard et al.

[11] 3,943,513
[45] Mar. 9, 1976

[54] SYSTEM AND METHOD FOR SELECTING DOPPLER ALTERED REFLECTED SIGNALS

[75] Inventors: Everett Eberhard, Tempe; Frank S. Gemmell, Scottsdale; Randolph G. Moore, Phoenix, all of Ariz.

[73] Assignee: Motorola Inc., Phoenix, Ariz.

[22] Filed: Jan. 13, 1975

[21] Appl. No.: 540,360

Related U.S. Application Data
[63] Continuation of Ser. No. 367,087, June 4, 1973, abandoned.

[52] U.S. Cl. .................................................. 343/7.7
[51] Int. Cl.² .......................................... G01S 9/42
[58] Field of Search ..................................... 343/7.7

[56] References Cited
UNITED STATES PATENTS

| | | | |
|---|---|---|---|
| 2,982,955 | 5/1961 | Enenstein | 343/7.7 |
| 3,046,548 | 7/1962 | Briskin | 343/7.7 |
| 3,386,094 | 5/1968 | Kratzer et al. | 343/7.7 X |
| 3,728,721 | 4/1973 | Lee et al. | 343/7.7 X |
| 3,757,329 | 9/1973 | Sato et al. | 343/8 |
| 3,760,400 | 9/1973 | Galvin | 343/7.7 X |
| 3,781,773 | 12/1973 | Ravas | 343/7.7 X |

*Primary Examiner*—Malcolm F. Hubler
*Attorney, Agent, or Firm*—M. David Shapiro; Sang Ki. Lee; Harry M. Weiss

[57] ABSTRACT

A matched transmission line coupling an RF generator to an antenna and receiving Doppler altered reflected signals from the antenna. A pair of diodes coupled to the transmission line 90 electrical degrees apart at the RF frequency and oppositely poled so that the RF signal from the generator and the reflected signal from the antenna are heterodyned in each diode to produce a heterodyne signal which is in phase. The heterodyne signals are band limited, filtered and passed through threshold detectors separately to provide separate in phase pulses which are applied to a coincidence gate to provide an output. Amplitude modulation is rejected because it produces out of phase signals and frequency modulation is rejected because the transmission line is substantially flat. The RF generator may be frequency modulated and the output of the coincidence gate is applied to a shift register to insure the triggering thereof by only a true Doppler signal.

13 Claims, 4 Drawing Figures

SYSTEM AND METHOD FOR SELECTING DOPPLER ALTERED REFLECTED SIGNALS

This is a continuation of application Ser. No. 367,087, filed June 4, 1973, now abandoned.

BACKGROUND OF THE INVENTION

Systems receiving Doppler altered reflected signals, such as the present system, are utilized as proximity sensors and may be incorporated in Doppler radars and similar type equipment. Many different circuits and apparatus have been devised for eliminating spurious responses in radar and the like. In general, these circuits or devices utilize separate systems which are combined to cancel spurious signals or separate signals are developed and combined to cancel the spurious signals. In general, it is common practice to combine signals so that spurious or unwanted signals are canceled and only the desired signals are available at the output. For cancellation to be effective good amplitude balance must be maintained between the parts of the signal being combined. In most of these systems it is extremely difficult to prevent the passage through the system of interfering signals caused by mechanical vibrations, modulation of the voltage supply, etc.

At the present time the simplest type of Doppler sensor uses an RF generator, antenna (possible separate antennas for transmitting and receiving), mixer and receiver. This system recognizes the presence of a moving reflection body simply by the amplitude of the Doppler shifted received signal. When the signal exceeds a set threshold level the target is present. A sensitive Doppler detection system requires the use of a high gain amplifier at the particular Doppler frequency expected, which in many instances is an audio frequency. The use of the high gain amplifier makes such systems vulnerable to audio frequency disturbances, such as mechanical vibrations, modulation of the supply voltage, or other RF signals modulated by frequenices within the pass band of the high gain amplifier.

Doppler detection systems using several types of balanced mixers have been employed. Many of these systems use separate transmitting and receiving antennas. Although a two antenna system may provide advantages in performance, it generally increases the system cost considerably and requires more space, which may not be available in some applications.

SUMMARY OF THE INVENTION

The present invention pertains to a system adapted to transmit radio frequency signals and receive Doppler altered reflected signals including generating means providing the RF signals and antenna means coupled thereto for transmitting said RF signals and receiving reflected signals, tuned means coupled to said generating and antenna means for receiving the RF and reflected signals and providing the RF signal with a first and second phase, said phases having a predetermined fixed relationship relative to each other, and providing the reflected signals with a first and second phase having a predetermined fixed relationship relative to each other, the predetermined fixed relationship being for example 90° at the frequency of the RF signal, first and second heterodyning means for heterodyning the first phase of the RF signal and the second phase of the reflected signal and for heterodyning the second phase of the RF signal and the first phase of the reflected signal, respectively, said heterodyning means producing two heterodyne signals having a predetermined fixed relationship relative to each other, such as in phase, and circuit means sensitive to signals having substantially said predetermined phase relationship and providing an output in response thereto. The circuit means may include a shift register or the like so that more than one in phase signal or pulse is required to provide the output.

By utilizing a relatively flat or matched transmission line as the tuned means frequency modulated signals are eliminated. Since amplitude modulated signals have a different phase relationship than the RF and reflected signals, amplitude modulated signals have no effect on the circuitry. To improve the response of the system, the signal from each heterodyning means is wideband limited and applied through a pass band filter to a threshold detector. The pulses are then applied to a coincidence gate, the output of which is applied to logic circuitry requiring a plurality of pulses before supplying an output. To reduce the response to certain interfering signals the RF signal is FM modulated.

It is an object of the present invention to provide an improved system sensitive to Doppler altered reflected signals.

It is a further object of the present invention to provide an improved system sensitive to Doppler altered reflected signals which is relatively insensitive to interfering signals and amplitude modulated interfering signals or disturbances.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBOODIMENTS

Figure 1:
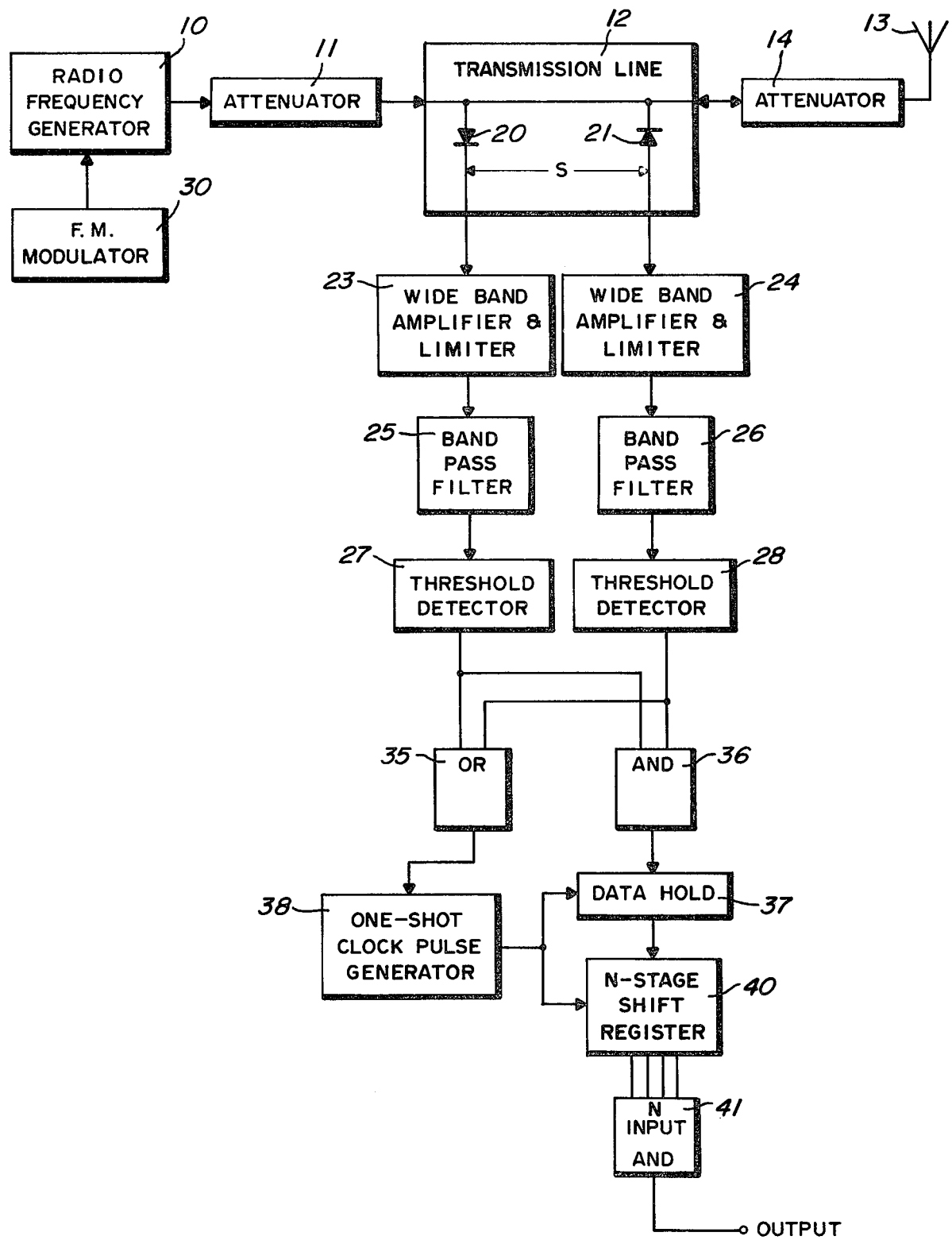
FIG. 1 is a block diagram of a preferred embodiment of the present system.

Referring specifically to FIG. 1, a radio frequency (RF) generator 10 is connected through an attenuator 11 to one end of a transmission line 12. An antenna 13 is connected through an attenuator 14 to the other end of the transmission line 12. The generator 10 supplies an RF signal through the attenuator 11, transmission line 12 and attenuator 14 to the antenna 13 for transmission. If the transmitted RF signal strikes an object, a portion of the transmitted signal is reflected back to the antenna 13, which reflected signal is coupled into the transmission line 12 through the attenuator 14. Assuming there is relative movement between the system of FIG. 1 and the object reflecting the RF signals back to the antenna 13, the reflected signals will be Doppler altered or shifted in frequency by the relative movement. Generally this shift in frequency will be relatively low, approximately in the audio range, and the amount of shift will be generally predictable through some knowledge of the movements of the system and the object reflecting the RF signal.

First and second heterodyning means, which in this embodiment are a diode 20 and a diode 21, are connected to the transmission line 12 in spaced apart relationship. While it should be understood that any of the well known devices for heterodyning signals might be utilized, the diodes 20 and 21 are illustrated because of their simplicity and ease of integration, as will be described presently. The anode of the diode 20 is connected to the transmission line 12 and the cathode is connected to a wideband amplifier and limiter 23. The cathode of the diode 21 is connected to the transmission line and the anode is connected to a wideband amplifier and limiter 24. The spacing between the points on the transmission line 12 at which the anode of the diode 20 and the cathode of the diode 21 are connected is designated S and, in the present embodiment, is 90 electrical degrees at the frequency of the RF generator 10. As the disclosure progresses it will become apparent that the spacing S could be any convenient distance. However, 90° is chosen for the spacing S in the preferred embodiment for a number of reasons which will be described in more detail presently.

Because the diodes 20 and 21 are spaced 90 electrical degrees apart at the frequency of the generator 10, the RF signal applied from the generator 10 through the transmission line 12 to the antenna 13 will always have a predetermined fixed phase relationship at the diode 21 relative to the diode 20, which phase relationship in the present embodiment is 90° apart. Similarly, the return signal applied to the transmission line 12 from the antenna 13 will always have a predetermined fixed phase relationship at the diode 20 relative to the diode 21, which phase relationship in the present embodiment is 90° apart. Since the return signal is approximately the same frequency as the RF signal, the spacing of the diodes 20 and 21 is approximately 90° for the return signal as well as the RF signal. The phase of the difference frequency of the heterodyned signals will be determined by the relative phases of the RF and return signals being heterodyned. In the present embodiment the 90° spacing between the diodes 20 and 21 provides a 180° phase difference between the heterodyne signals at the diodes 20 and 21. With the diodes 20 and 21 oppositely poled as illustrated in FIG. 1, the heterodyne signals available at the outputs thereof are in phase. It will be assumed that, for any specific use, the relative speeds between the system and the object reflecting the RF signal will be well defined and, therefore, the amount of shift in the frequency of the return signal due to the Doppler effect will lie within a specific band. While this band may change for different uses of the system, it should be well known and defined for any specific use. In general, however, the frequency shift of the return signal is small (in the neighborhood of a few parts per million) relative to the frequency of the RF signal so that the spacing between the diodes 20 and 21 is constant throughout the band.

As previously mentioned, one of the major sources of difficulties, such as false signals and the like, in prior art systems is amplitude modulation at frequencies in the band of signals described above. This amplitude modulation may be caused by instability of the RF generator 10, fluctuations of the power supply, external interfering signals received by the antenna 13, etc. When these amplitude modulated signals are detected directly (i.e., no heterodyning with the RF signal) by the diodes 20 and 21 there will be no appreciable phase shift between the signal at the diode 20 and at the diode 21 because the spacing S between the diodes 20 and 21 is short relative to the frequency of the amplitude modulation (as described above). Therefore direct detection of any amplitude modulation of signals in the transmission line 12 will result in signals at the outputs of the diodes 20 and 21 which are out of phase by 180°. It will of course be understood that adjustments of the spacing S and the poling of the diodes 20 and 21 will alter the phase relationship of amplitude modulated signals at the outputs of the diodes 20 and 21 as well as the phase relationship between the desired heterodyne signals and all such variations are encompassed within this disclosure. For example, if the spacing S is retaining at 90° but the diodes 20 and 21 are poled in the same direction, the heterodyne signals will be out of phase and the amplitude modulated signals will be in phase. It is essential that the spacing S and poling of the diodes 20 and 21 be adjusted to provide a sufficient difference between the phases of the heterodyne signals and the phases of the amplitude modulated signals so that they can be separated by subsequent operations.

If frequency modulation of either the RF signl from the generator 10 or an interfering signal received by the antenna 13 is present in the transmission line 12, the phase of signals produced by detection of the frequency modulation at the outputs of diodes 20 and 21 will depend on the position of the standing wave present on the transmission line 12. If the standing wave ratio of the transmission line 12 is substantially flat, or near 1, the diodes 20 and 21 detect very little signal and the effects due to frequency modulation are minimized. In the embodiment of FIG. 1, attenuators 11 and 14 are utilized to provide a match between the input and output impedances of the transmission line 12 to reduce the voltage standing wave ratio on the line 12 as low as practical. It will of course be understood by those skilled in the art that the attenuators 11 and 14 will not be required in many instances where a flat or matched transmission line can be provided. In general, the voltage standing wave ratio on the transmission line 12 should be held to a low enough value to make the effects due to frequency modulation low compared to the effects due to amplitude modulation. If this condition is met, the signals due to amplitude modulation effects will override any residual frequency effect due to the standing wave on the transmission line 12 (frequency modulation) and any low frequency interfering signal that is not generated by heterodyning of the RF signal and the return signal will always be out of phase by 180° at the output of the diodes 20 and 21.

The detected signals, including any desired heterodyne signals, from the diodes 20 and 21 are applied to the wide-band amplifier and limiter circuits 23 and 24, respectively. The outputs of the circuits 23 and 24 are applied to bandpass filters 25 and 26, respectively, the outputs of which are in turn applied to threshold detectors 27 and 28, respectively. Each channel, including wideband amplifier and limiter 23 or 24, bandpass filter 25 or 26, and threshold detector 27 or 28 should be substantially similar to minimize any shifting of the phase as the signals are processed therein. The bandpass of the filters 25 and 26 should be slightly greater than the maximum deviation of frequency in the return signals due to the Doppler effect. The bandpass of the wideband amplifiers 23 and 24 should be large relative to the bandpass of the filters 25 and 26 and in tthe present embodiment it is approximately 50 times as wide. The wideband amplifiers 23 and 24 provide sufficient gain to give the desired sensitivity to the system and the wideband amplifying and limiting action of the circuits 23 and 24 provide improved performance, particularly in the rejection of interfering signals that may come within the bandpass of the wideband amplifiers but not in the bandpass of the filters 25 and 26. If a strong interfering signal is present within the bandpass of the wideband amplifier and limiter circuits 23 and 24, the limiters operate to reduce the overall sensitivity so that components of the interfering signal, which fall within the bandpass of the filters 25 and 26, will be substantially reduced in amplitude. This is true because in the wideband limiting action the amount of energy in the band must remain constant and as any one signal within the band increases in amplitude the remaining signals within the band must be reduced in amplitude.

To further improve the rejection of interfering signals, the RF generator 10 is frequency modulated by a modulator 30. While the signal utilized in the modulator 30 to frequency modulate the RF signal from the generator 10 may be any desired signal, in the present embodiment is randomly varying signal or noise is utilized. The noise is in a frequency band above the band of the filters 25 and 26 and, to insure that the RF signal from the generator 10 and the return signal from the antenna 13 are not varying too widely relative to each other, the band of noise should be limited. Because the RF signal from the generator 10 is continuously varying in frequency, any interfering RF signal, which may have a frequency close to that of the generator 10, will be heterodyned with the signal from the generator 10 in the diodes 20 and 21 and produce a "noise" signal which may fill the entire pass band of the circuits 23 and 24. Since the circuits 23 and 24 limit the amount of energy that can pass therethrough, filling the entire pass band greatly reduces the amplitude across the entire pass band, including the pass band of the filters 25 and 26. However, if a proper return signal is received by the antenna 13 a strong relatively non-varying heterodyne signal will be supplied to the circuits 23 and 24 within the pass band of the filters 25 and 26. This signal will override the diluted interfering signal and provide a strong output from the filters 25 and 26. Thus, the combination of the frequency modulation of the generator 10 and the wideband limiting action reduces the possibility of interfering signals producing a false output in the system.

Signals that pass through the filters 25 and 26 are applied to the threshold detectors 27 and 28, respectively, which detectors provide output pulses when the amplitude of an input signal exceeds a predetermined threshold. The output pulses from both of the detectors 27 and 28 are applied to two inputs of an OR gate 35 and to two inputs of a coincidence or AND gate 36. Since the desired heterodyne signal, produced from the RF signal and the return signal, produces in phase pulses at the outputs of the detectors 27 and 28, these in phase pulses will always overlap or coincide at least in part. However, amplitude modulated signals, which are 180° out of phase at the outputs of the diodes 20 and 21, result in pulses at the outputs of the detectors 27 and 28 which do not overlap or coincide. Since the threshold detectors 27 and 28 allow only the peaks of pulses to pass, the amplitude modulated signals will not overlap even if the amplitudes are well above the threshold level.

Figure 2:
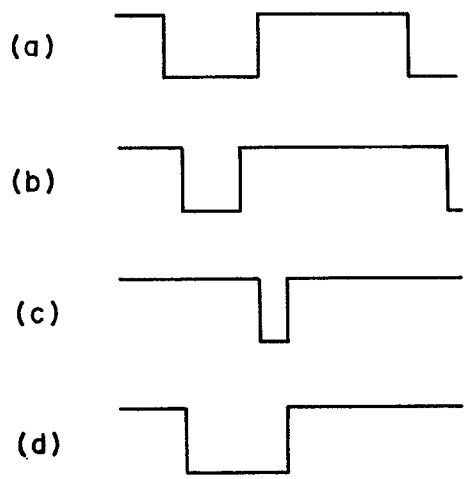
FIG. 2 depicts some waveforms present in the circuitry of FIG. 1.

Each time two overlapping or coincident pulses are applied to the AND gate 36 a pulse is supplied to a data hold circuit 37. Each time a pulse is applied to either of the inputs of the OR gate 35 a pulse is supplied to a one shot clock pulse generator 38. Although the present embodiment uses a one shot pulse generator, other types of pulse forming circuits may be used. The trailing edge of the pulse from the OR gate 35 triggers the clock pulse generator 38 which in turn supplies a pulse to an N-stage shift register 40 and to a reset input of the data hold 37. The leading edge of the pulse from the AND gate 36 triggers or sets the data hold circuit 37 which supplies a pulse to the shift register 40. The pulse from the data hold circuit 37 continues until the circuit 37 is reset by the pulse from the clock pulse generator 38. Referring to FIG. 2; 2(a) illustrates the pulses from the OR gate 35, 2(b) illustrates the pulses from the AND gate 36, 2(c) illustrates the pulses from the clock pulse generator 38 and 2(d) illustrates the pulses from the data hold circuit 37. It should be noted that the pulse from the OR gate 35 will alwyas be as wide as or wider than the pulses from the AND gate 36 (see FIG. 2) because the OR gate 35 remains conductive as long as a pulse is applied to either input and the AND gate 36 is only conductive as long as a pulse is applied to both inputs simultaneously. Since the clock pulse generator 38 is triggered by the trailing edge of the pulse from the OR gate 35 and, in some instances, the pulse from the AND gate 36 may have already terminated (see FIG. 2), the pulse from the AND gate 36 is stored by the circuit 37 until the pulse from the clock pulse generator 38 terminates. This insures that the data pulse from the AND gate 36 and the clock pulse from the generator 38 will be available at the shift register 40 simultaneously.

For a true return signal at the antenna 13, the signals available in the logic circuit will appear substantially as illustrated in FIG. 2. Each output pulse from the clock pulse generator 38 will coincide with the output pulse from the data hold circuit 37 and data will be shifted into the register 40. After n consecutive pulses are shifted into the register 40, the register 40 will supply $n$ simultaneous or coincident inputs to an N-input AND gate 41, which will supply an output signal indicating that a true return signal has been received by the antenna 13. The number of stages in the shift register 40 will be determined by the particular application of the system, the time available in determining whether the return signal is accurate and the accuracy required. For instance, in some cases it might be desirable to receive 100 pulses of the Doppler signal before signifying that this is a true signal, in other cases only two or three pulses may be required. Hence, the system described will provide an output signal only after the reception of $n$ consecutive pulses that coincide in time in the two channels. While many logic circuits other than that illustrated in FIG. 1 may be utilized, this preferred embodiment is illustrated because the amplitudes and phases of the two channels are permitted to vary considerably without compromising the processing of the data and the accuracy of the system.

Figure 4:
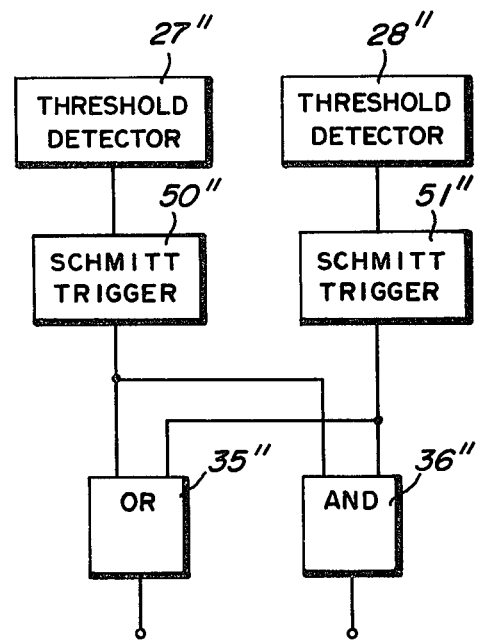
FIG. 4 is a block diagram of a portion of the circuitry illustrated in FIG. 1, illustrating another embodiment of the logic therefor.
Figure 3:
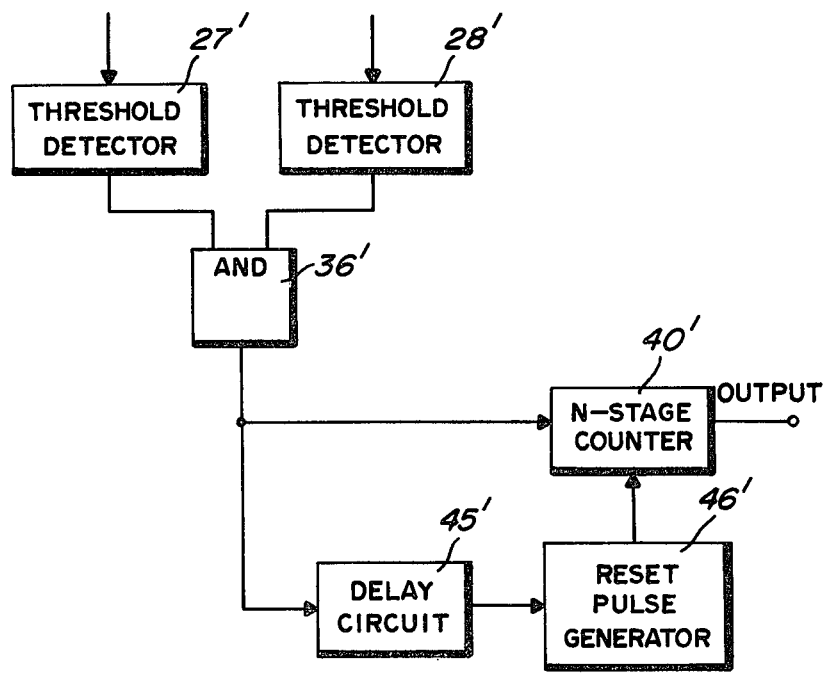
FIG. 3 is a block diagram of a portion of the circuitry illustrated in FIG. 1, illustrating another embodiment of the logic therefor.

Referring to FIG. 3, a second embodiment of logic circuitry which can be utilized in cooperation with the output pulses from threshold detectors is illustrated. Two threshold detectors 27' and 28' are illustrated and it should be understood that these detectors are similar to the detectors 27 and 28 of FIG. 1 and circuitry prior thereto will be the same as circuitry prior to the detectors 27 and 28. Output pulses from the detectors 27' and 28' are applied to two inputs of a coincidence or AND gate 36', the output pulses of which are applied to an N-stage counter 40' and a delay circuit 45'. Pulses from the delay circuit 45' are applied to a reset pulse generator 46' the output pulses of which are applied to reset the counter 40'. The N-stage counter 40' accumulates pulses from the AND gate 36' and supplies an output when a predetermined number, n, of pulses are applied to the counter 40'. In order to prevent an output from the counter 40' due to the accumulation of noise pulses over a long period of time, the delay circuit 45' activates the pulse generator 46' to supply a reset pulse to the counter 40' a predetermined period of time after the first pulse is applied to the counter 40'.

a variation of the circuit of FIG. 1 is shown in FIG. 4. In this embodiment of the logic circuitry Schmitt triggers 50'' and 51'' are placed between the threshold detectors 27'' and 28'', respectively, and the two gates 35'' and 36''. This arrangement has improved performance over the circuit of FIG. 1 when noise is superimposed on the signal.

Without the Schmitt trigger circuits 50'' and 51'' noise can cause multiple pulses to be developed in both channels due to the signal crossing the threshold level several times at the peak of the Doppler cycle. The dta hold circuit 37 of FIG. 1 will remove the multiple pulse from the data channel however, multiple pulses in the clock channel can cause more than one data pulse to be stored in the register 40 during the peak of the Doppler cycle. If the Schmitt trigger circuits 50'' and 51'' of FIG. 4 are designed with appreciable hysteresis (it triggers "on" at a higher input level than it triggers "off") this problem can be virtually eliminated by the logic arrangement of FIG. 4.

It will of course be understood that many other logic systems may be devised but the three systems illustrated are exemplary of apparatus for accumulating pulses to prevent an output from the system due to pulses produced by noise or interference signals.

The described system is simple and can be readily integrated. The RF generator 10, transmission line 12 (and attenuators 11 and 14 if required) and the FM modulator 30 can be produced in hybrid integrated form with the circuit fitting on a 1 by 2 inch substrate. The two wideband amplifier-limiters can be produced in monolithic form on a single silicon chip with 4 to 6 external capacitors per channel being required for the bandpass filters 25 and 26. The logic or digital portion of the circuit illustrated in FIGS. 1, 3 and 4 can be readily integrated with all the circuitry from the threshold detectors 27 and 28 through the output on a single substrate. Assuming the shift register 40 has only four or five stages, it can be integrated on a chip no greater than 80 mils square. Thus, the entire electronic portion of the system can be incorporated in one hybrid integrated circuit, two integrated circuits (which may be packaged in dual inline packages) and several capacitors.

Thus, an improved system is disclosed which is adapted to transmit radio frequency signals and receive Doppler altered reflected signals. The system is relatively insensitive to amplitude modulated signals produced by mechanical vibrations, modulation of supply voltages, RF signals modulated by frequencies within the pass band of the amplifiers 23 and 24, etc. Further, the system is relatively insensitive to interfering signals with frequencies close to that of the RF signal transmitted by the system because the RF signal is continuously varying in frequency and a predetermined number of true reflected signals must be received before the system produces an output. Thus, it would be necessary for an interfering signal to track the RF signal produced by the generator 10 before sufficient pulses could be supplied by the channels to the logic circuitry to produce an output therefrom.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:
1. A system adapted to transmit radio frequency signals and receivie Doppler altered reflected signals comprising:
   a. generating means providing a radio frequency signal;
   b. antenna means coupled to said generating means for transmitting said radio frequency signal and adapted to receive reflected signals;
   c. tuned means coupled to said generating means and said antenna means for receiving the radio frequency signal and reflected signals, said tuned means providing the radio frequency signal having a first phase and the radio frequency signal having a second phase, said first and second phases of the radio frequency signal having a predetermined fixed relationship relative to each other, and providing the reflected signals having a first phase and having a second phase, said first and second phases of the reflected signals having a predetermined fixed relationship relative to each other;
   d. first heterodyning means coupled to said tuned means for receiving said first phase of the radio frequency signal and said second phase of the reflected signal and providing a first heterodyne signal to an output thereof;
   e. second heterodyning means coupled to said tuned means for receiving said second phase of the radio frequency signal and said first phase of the reflected signal and providing at an output thereof a second heterodyne signal having a predetermined fixed relationship relative to said first heterodyne signal;
   f. first amplifier means coupled to said first heterodyning means for providing wideband amplification and amplitude limiting of said first heterodyne signal and providing a first amplified signal to an output thereof;
   g. second amplifier means coupled to said second heterodyning means for providing wideband amplification and amplitude limiting of said second heterodyne signal and providing a second amplified signal to an output thereof;
   h. first bandpass filter means coupled to said first amplifier means for providing rejection of undesirable frequency components both above and below a desirable band of frequency components within said first amplifier signal and providing a first bandpass filtered signal to an output thereof;
   i. second bandpass filter means coupled to said second amplifier means for providing rejection of undesirable frequency components both above and below a desirable band of frequency components within said second amplified signal and providing a second bandpass filtered signal to an output thereof;

j. first threshold detector means coupled to said first bandpass filter means for providing an output thereof in response to existance of said first bandpass filtered signal at input thereof;

k. second threshold detector means coupled to said second bandpass filter means for providing an output thereof in response to existance of said first bandpass filtered signal at input thereof; and l. coincidence detection means being sensitive to the presence of input signals coupled from said first threshold detector and said second threshold detector simultaneously, said coincidence detection means for providing an output in response to said simultaneous inputs.

2. A system as claimed in claim 1 including in addition modulating means coupled to the generating means for frequency modulating the radio frequency signal.

3. A method of transmitting a radio frequency signal and selecting a Doppler altered reflected signal from interfering signals comprising the steps of:

a. transmitting noise modulated radio frequency signals;

b. receiving Doppler altered reflected signals;

c. heterodyning the radio frequency signals and the reflected signals to provide first heterodyne signals;

d. altering the phase of receiving signals lying within a predetermined band of frequencies including the Doppler altered reflected signals and heterodyning the radio frequency signals and the reflected signals to provide second heterodyne signals having a predetermined phase relationship to the first heterodyne signals;

e. amplifying the first and second heterodyne signals in broad band amplifiers to distribute the signal energy across a broad spectrum;

f. filtering the first and second heterodyne signals in a narrow bandpass filter to pass that portion of the signal spectrum containing the Doppler frequencies and to reject the majority of the signal spectrum containing the noise modulation; and g. applying the first heterodyne signals and the second heterodyne signals to electronic circuitry which provides an output only in response to the application of two signals having the predetermined phase relationship.

4. A system adapted to transmit radio frequency signals and receive Doppler altered reflected signals comprising:

a. generating means providing a radio frequency output;

b. antenna means adapted to transmit said radio frequency output and receive reflected signals;

c. transmission line means coupling the output of said generating means to said antenna means and receiving the reflected signals therefrom, said transmission line having first and second signal pick-off terminals positioned a predetermined number of electrical degrees apart relative to the frequency of the output of said generating means;

d. first and second heterodyning means coupled to said first and second pick-off terminals, respectively, for providing first and second heterodyne signals each representative of the heterodyned output signal of said generating means and the reflected signal received in said transmission line, said first and second heterodyne signals having a predetermined phase relationship therebetween dependent upon the predetermined number of electrical degrees of separation between said first and second pick-off terminals and the inherent phase shift of each of said first and second heterodyning means;

e. frequency modulation means for noise modulating said generating means, said frequency modulation means having a predetermined noise output bandwidth;

f. first and second amplifying means for amplifying and limiting said first and second heterodyne signals, respectively, said first and second amplifying means each having an output terminal and having a bandwidth substantially equal to said predetermined noise output bandwidth of said frequency modulation means;

g. first and second bandpass filter means for limiting the signal bandwidth from said first and second amplifying means, said bandpass filter means having a bandwidth small with respect to said predetermined noise output bandwidth of said frequency modulation means, said first and second bandpass filter means each having an input terminal connected to said output terminal of said first and second amplifying means, respectively, and each of said first and second bandpass filter means having an output terminal; and h. circuit means for receiving signals from said output terminals of said first and second bandpass filter means, said circuit means being sensitive to signals having substantially said predetermined phase relationship and providing an output in response thereto.

5. A system as claimed in claim 4 wherein the antenna means includes a single antenna for transmitting and receiving.

6. A system as claimed in claim 4 wherein the transmission line includes 90 electrical degrees, relative to the frequency of the output of said generating means, of spacing between the first and second signal pick-off terminals.

7. A system as claimed in claim 6 wherein the first and second heterodyning means each include a diode connected to have applied at one element the output signal of the generating means and the reflected signal received in the transmission line and to have available at the other element heterodyne signals.

8. A system as claimed in claim 7 wherein the first and second heterodyning means include oppositely poled diodes for providing heterodyne signals at the output elements thereof which are substantially in phase relative to each other.

9. A system as claimed in claim 8 wherein the circuit means include a coincidence gate connected to receive the first and second heterodyne signals each on a separate input.

10. A system as claimed in claim 8 wherein the circuit means include first and second threshold detectors connected to receive the first and second heterodyne signals, respectively, from the bandpass filter means, said threshold detectors passing only portions of the signals applied thereto which exceed a predetermined threshold.

11. A system as claimed in claim 4 wherein the transmission line means includes means substantially matching the input and output impedances of said transmission line means to the characteristic impedance of said transmission line means at the frequencies of the radio frequency signal of the generating means and the reflected signals.

12. A system as claimed in claim 4 wherein the circuit means includes logic circuitry for counting the cycles of signals applied thereto having substantially the predetermined phase relationship and providing an output upon the number of counted cycles exceeding a predetermined number.

13. A system as claimed in claim 12 wherein the output depends on a consecutive number of counted cycles exceeding a predetermined number.

* * * * *